US009528245B2

(12) United States Patent
Goto et al.

(10) Patent No.: US 9,528,245 B2
(45) Date of Patent: Dec. 27, 2016

(54) ROTATION CONTROL DEVICE AND CONSTRUCTION MACHINE INCLUDING ROTATION CONTROL DEVICE

(71) Applicant: Kobelco Construction Machinery Co., Ltd., Hiroshima-shi (JP)

(72) Inventors: Naoki Goto, Hiroshima (JP); Koji Ueda, Hiroshima (JP); Yusuke Kamimura, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 293 days.

(21) Appl. No.: 14/132,704

(22) Filed: Dec. 18, 2013

(65) Prior Publication Data

US 2014/0178167 A1 Jun. 26, 2014

(30) Foreign Application Priority Data

Dec. 26, 2012 (JP) ................................ 2012-282484

(51) Int. Cl.
*F16D 31/02* (2006.01)
*E02F 9/12* (2006.01)
(Continued)

(52) U.S. Cl.
CPC ............. *E02F 9/123* (2013.01); *E02F 9/2235* (2013.01); *E02F 9/2285* (2013.01);
(Continued)

(58) Field of Classification Search
CPC .. F15B 11/048; F15B 2211/6652; E02F 9/128
See application file for complete search history.

(56) References Cited

U.S. PATENT DOCUMENTS 3,999,387 A * 12/1976 Knopf ................. F16H 61/4139 60/444
5,941,155 A * 8/1999 Arai ........................ E02F 9/123 60/468
2013/0213026 A1* 8/2013 Yamamoto ............. B66C 23/86 60/327

FOREIGN PATENT DOCUMENTS

JP 11-30204 A 2/1999
JP 2004-36811 A 2/2004
(Continued)

OTHER PUBLICATIONS

Office Action issued on Apr. 19, 2016 in Japanese Patent Application No. 2012-282484 (with unedited computer generated English translation).

(Continued)

*Primary Examiner* — Thomas E Lazo
*Assistant Examiner* — Daniel Collins
(74) *Attorney, Agent, or Firm* — Oblon, McClelland, Maier & Neustadt, L.L.P.

(57) ABSTRACT

The invention provides a rotation control device capable of reducing a loss of a power of a hydraulic pump in a backward direction operation and also provides a construction machine including the same. The controller controls a capacity of the hydraulic pump such that, in a forward direction operation in which an operating direction detected by the operation sensor and a rotating direction detected by a rotation sensor coincide with each other, the capacity of the hydraulic pump is increased in accordance with an increase in the operation amount detected by an operation sensor, on the other hand, restricts the capacity of the hydraulic pump more in a backward direction operation, in which the operating direction detected by the operation sensor and the rotating direction detected by the rotation sensor are reverse to each other, than in the forward direction operation.

6 Claims, 5 Drawing Sheets

(51) Int. Cl.
*E02F 9/22* (2006.01)
*F15B 11/048* (2006.01)

(52) U.S. Cl.
CPC .......... *E02F 9/2296* (2013.01); *F15B 11/048* (2013.01); *F15B 2211/20546* (2013.01); *F15B 2211/50527* (2013.01); *F15B 2211/50536* (2013.01); *F15B 2211/6336* (2013.01); *F15B 2211/6346* (2013.01); *F15B 2211/665* (2013.01); *F15B 2211/7058* (2013.01); *F15B 2211/755* (2013.01); *F15B 2211/761* (2013.01); *F15B 2211/77* (2013.01); *F15B 2211/85* (2013.01); *F15B 2211/88* (2013.01)

(56) References Cited

FOREIGN PATENT DOCUMENTS

| | | | | |
|---|---|---|---|---|
| JP | 2010-156136 A | | 7/2010 | |
| JP | 2012-62653 A | | 3/2012 | |
| JP | 2012-82643 A | | 4/2012 | |
| WO | WO2012035735 | * | 3/2012 | ............. B66C 23/86 |

OTHER PUBLICATIONS

Office Action issued Jul. 12, 2016 in Japanese Patent Application No. 2012-282484 (with unedited computer generated English language translation).

* cited by examiner

ROTATION CONTROL DEVICE AND CONSTRUCTION MACHINE INCLUDING ROTATION CONTROL DEVICE

BACKGROUND OF THE INVENTION

1. Field of the Invention

The present invention relates to a rotation control device of a construction machine, which has a slewing body driven to rotate by a slewing motor (a hydraulic motor), as represented by a hydraulic shovel.

2. Description of the Related Art

In a related art, for example, a rotation system of a hydraulic shovel includes a hydraulic pump supplying a hydraulic fluid to the slewing motor, a control valve controlling charge/discharge of the hydraulic field to/from the slewing motor, rotation operating means for operating the control valve (hereinafter, explained in a case of a general remote-controlled valve), and relief valves respectively provided to a hydraulic fluid path for right rotating and a hydraulic fluid path for left rotating between the slewing motor and the control valve (refer to Japanese Unexamined Patent Application No. 2010-156136).

According to the rotation system, for example, when the remote-controlled valve is operated in a right rotating direction, the hydraulic fluid is supplied to the slewing motor via the hydraulic fluid path for right rotating. Thereby, a slewing body starts rotating in the right direction.

Here, the control valve is configured to block a flow of the hydraulic fluid at a neutral position. Consequently, when the operation of the remote-controlled valve is stopped during the rotation of the slewing body in the right direction and the control valve is returned to the neutral position, the supply of the hydraulic fluid to the slewing motor is stopped, while a decelerating operation is activated to an upper slewing body by operating the relief valve. As a result, the upper slewing body is gradually stopped while being rotated by an inertia thereof.

On the other hand, there is a case of operating the control valve to a left rotating position by operating the remote-controlled valve in a reverse direction for switching to a left rotating operation while decelerating the right rotating operation. Hereinafter, an operation of the remote-controlled valve in a direction the same as the rotating direction is referred to as "forward direction operation", and an operation of the remote-controlled valve in a direction reverse to the rotating direction is referred to as "backward direction operation".

Here, a hydraulic shovel which carries out a so-called positive control (hereinafter, referred to as "posicon") is controlled such that the larger the operating amount of the remote-controlled valve, the larger the capacity of the hydraulic pump is made regardless of the rotating direction of the upper slewing body.

In the posicon, in a case of carrying out the backward operation, the hydraulic fluid of a flow rate in accordance with a magnitude of the operating amount is supplied to a hydraulic fluid path on a discharge side of the slewing motor (hydraulic fluid path for left rotating in the example). The hydraulic fluid is recovered to a tank via the relief valve without being used for accelerating the upper slewing body. Therefore, a loss of a power of the hydraulic pump is brought about in the backward direction operation.

SUMMARY OF THE INVENTION

It is an object of the present invention to provide a rotation control device capable of reducing a loss of a power of a hydraulic pump in a backward direction operation and also to provide a construction machine including the same.

In order to resolve the problem, the present invention provides a rotation control device including: a slewing motor driving a slewing body to rotate; a hydraulic pump serving as a hydraulic pressure source of the slewing motor; a pair of rotation hydraulic fluid paths connected to ports on both sides of the slewing motor for driving the slewing body in two directions; a control valve provided between the respective rotation hydraulic fluid paths and the hydraulic pump and switching a supply destination of a hydraulic fluid, which is discharged from the hydraulic pump, between the respective rotation hydraulic fluid paths; a pair of relief valves serving as brake valves respectively connected to the rotation hydraulic fluid paths; rotation operating means for operating the control valve; an operation detector detecting an operating direction and an operating amount of the rotation operating means; a rotation direction detector for detecting a rotating direction of the slewing body; and a controller controlling a discharge amount of the hydraulic pump such that in a forward direction operation in which the operating direction detected by the operation detector and the rotating direction detected by the rotation direction detector coincide with each other, the discharge amount of the hydraulic pump is increased in accordance with an increase in the operating amount detected by the operation detector, on the other hand, in a backward direction operation in which the operating direction detected by the operation detector and the rotating direction detected by the rotation direction detector are reverse to each other, the discharge amount of the hydraulic pump is restricted more than the discharge amount in the forward direction operation.

Also, the present invention provides a construction machine including a self-propelled lower propelling body, an upper slewing body rotatably provided to the lower propelling body, and the rotation control device for rotating the upper slewing body as the slewing body.

According to the present invention, a loss of a power of the hydraulic pump in the backward direction operation can be reduced.

DESCRIPTION OF THE PREFERRED EMBODIMENTS

An explanation will be given of an embodiment of the present invention in reference to the attached drawings as follows. Incidentally, the following embodiment is an example of embodying the present invention, and is not intended to limit a technical scope of the present invention.

Figure 1:
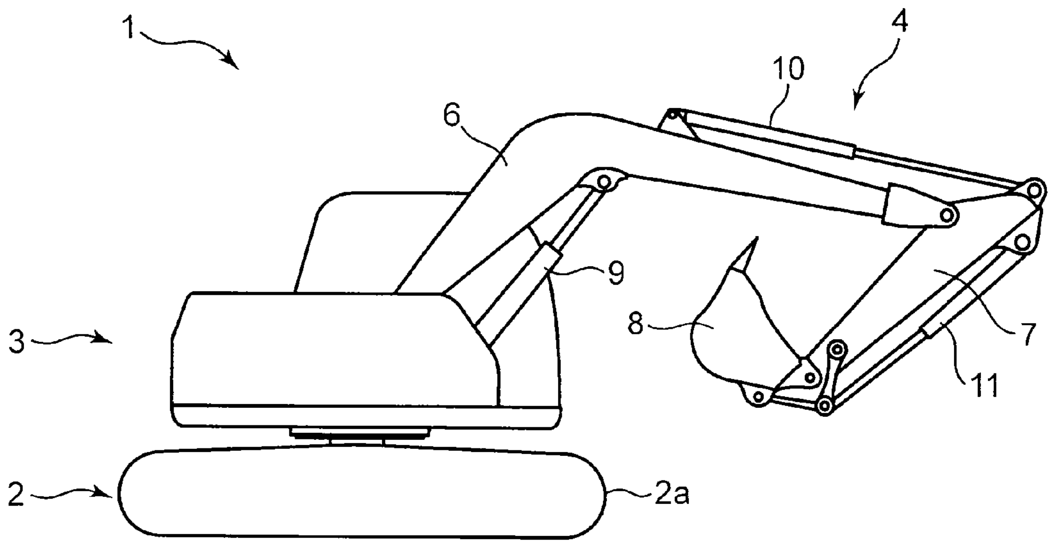
FIG. 1 is a right side view showing a hydraulic shovel according to first embodiment of the present invention.

In reference to FIG. 1, a hydraulic shovel 1 as an example of a construction machine includes a lower propelling body 2 having a crawler 2*a*, an upper slewing body (slewing body) 3 provided on the lower propelling body 2 to be rotatable around an axis vertical to the ground, an attachment 4 capable of rising and falling and provided to the upper slewing body 3, and a rotation control device 5 (refer to FIG. 2) controlling a rotating operation of the upper slewing body 3 relative to the lower propelling body 2.

The attachment 4 includes a boom 6 capable of rising and falling and provided to the upper slewing body 3, an arm 7 pivotably attached to a distal end portion of the boom 6, and a bucket 8 pivotably attached to a distal end of the arm 7. Also, the attachment 4 includes a boom cylinder 9 for making the boom 6 rise and fall, an arm cylinder 10 pivoting the arm 7, and a bucket cylinder 11 pivoting the bucket 8.

Figure 2:
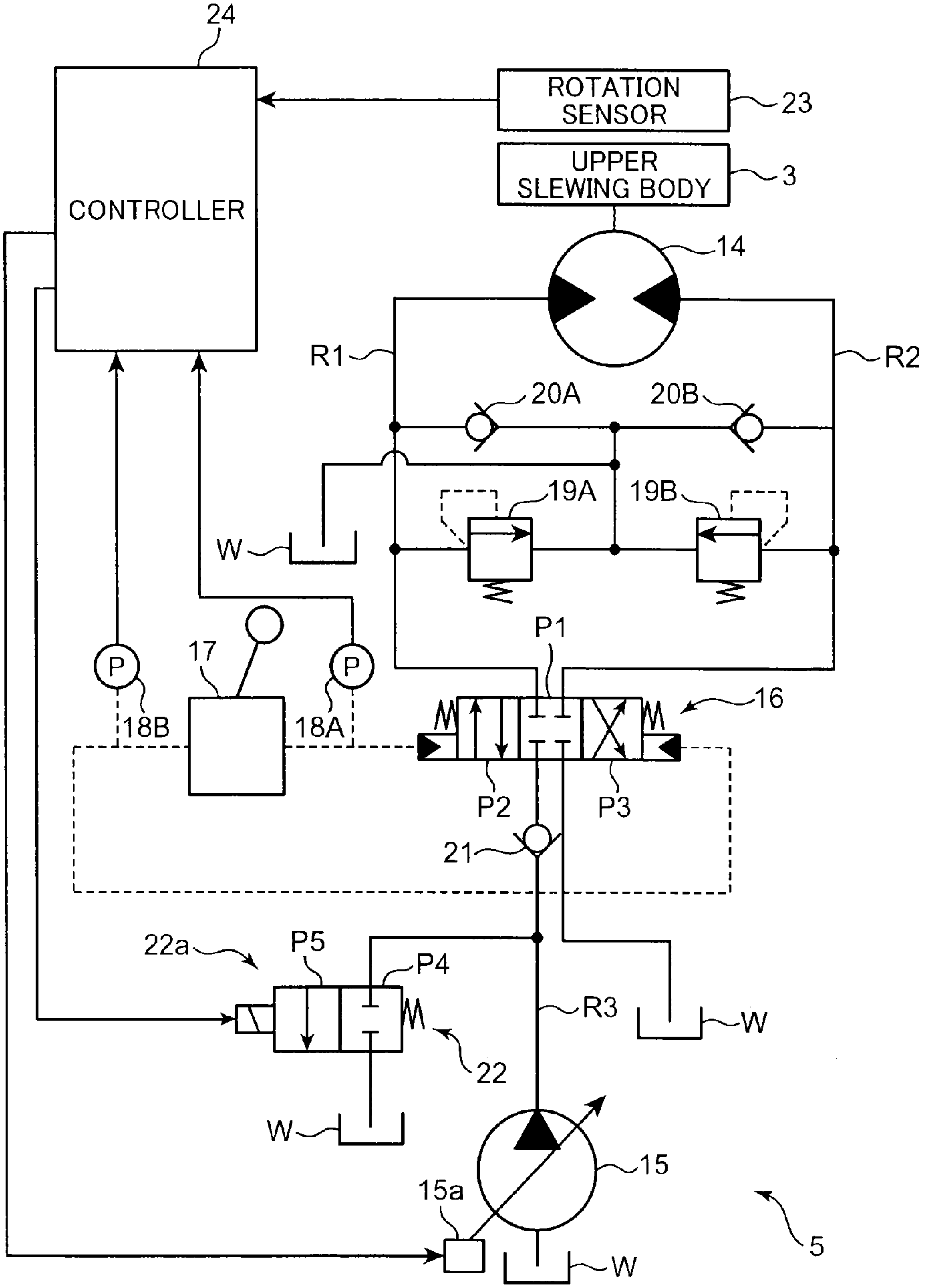
FIG. 2 is a circuit diagram showing a rotation control device of the hydraulic shovel shown in FIG. 1.

An explanation will be given of the rotation control device 5 in reference to FIG. 2 as follows.

The rotation control device 5 includes a slewing motor 14 driving to rotate the upper slewing body 3, a hydraulic pump 15 of a variable capacity type as a hydraulic pressure source of the slewing motor 14, a control valve 16 for switching a rotating direction of the slewing motor 14 (rotating direction of the upper slewing body 3), a right rotation hydraulic fluid path R1 and a left rotation hydraulic fluid path R2 connected to ports on both sides of the slewing motor 14 for driving the upper slewing body 3 in two left and right directions, a pair of relief valves 19A and 19B as brake valves respectively connected to the respective rotation hydraulic fluid paths R1 and R2, a remote-controlled valve 17 as rotating operating means for operating the control valve 16, operation sensors (operation detectors) 18A and 18B detecting an operating direction and an operating amount of the remote-controlled valve 17, an unloading circuit 22 for reducing a load of the hydraulic pump 15, a check valve 21 provided between the unloading circuit 22 and the control valve 16, a rotation sensor (rotation direction detector) 23 detecting a rotating direction of the upper slewing body 3, and a controller 24. Incidentally, notations 20A and 20B in FIG. 2 designate supplementary valves for supplementing a hydraulic fluid from a tank W to the hydraulic pump 15.

The hydraulic pump 15 includes a pump regulator 15*a* regulating a pump capacity by receiving an instruction from the controller 24 described later.

The control valve 16 includes a neutral position P1 for stopping the slewing motor 14, a right rotating position P2 for rotating the slewing motor 14 to the right by supplying a discharged hydraulic fluid of the hydraulic pump 15 to the right rotation hydraulic fluid path R1, and a left rotating position P3 for rotating the slewing motor 14 to the left by supplying the discharged hydraulic fluid of the hydraulic pump 15 to the left rotation hydraulic fluid path R2, and the switchover of these is implemented by the remote-controlled valve 17 activated by a lever operation.

The operation sensors 18A and 18B detect the operating direction and the operating amount of the remote-controlled valve 17 through a pilot pressure supplied to the control valve 16 and outputs detection signals thereof (right lever signal or left lever signal and signal concerning operating amounts thereof) to the controller 24.

The unloading circuit 22 is branched from a pump discharge path R3 connecting the hydraulic pump 15 and the control valve 16 and connected to the tank W. The unloading circuit 22 is provided with an unloading valve 22*a*.

The unloading valve 22*a* is an electromagnetic valve configured such that its opening area is made to be variable. Specifically, the unloading valve 22*a* is controlled to switch between a fully open position P5 permitting a flow from the hydraulic pump 15 to the tank W at a maximum flow rate, and a shut-off position P4 shutting off the flow of the hydraulic fluid from the hydraulic pump 15 to the tank W by the controller 24.

The check valve 21 is provided between a branch point to the unloading circuit 22 in the pump discharge path R3 and the control valve 16. The check valve 21 permits the flow of the hydraulic fluid from the hydraulic pump 15 to the control valve 16, and on the other hand, restricts a flow in a direction reverse thereto.

The rotation sensor 23 detects a rotation direction of the upper slewing body 3, and outputs a detection signal (right rotation signal or left rotation signal) to the controller 24.

The controller 24 adjusts a capacity (discharge amount) of the hydraulic pump 15 and the opening degree of the unloading valve 22*a* based on a detection result by the operation sensors 18A and 18B and the rotation sensor 23. An explanation will be given of a content of a control executed by the controller 24 in reference to FIG. 2 and FIG. 5 as follows.

The controller 24 switches the control content by whether the hydraulic shovel 1 is brought into a forward direction operation state in which the operation direction detected by the operation sensors 18A and 18B and the rotating direction detected by the rotation sensor 23 coincide with each other (whether reverse lever flag is made OFF), or in a backward direction operation state in which the operation direction and the rotating direction are in directions reverse to each other (whether reverse lever flag is made ON).

Figure 5:
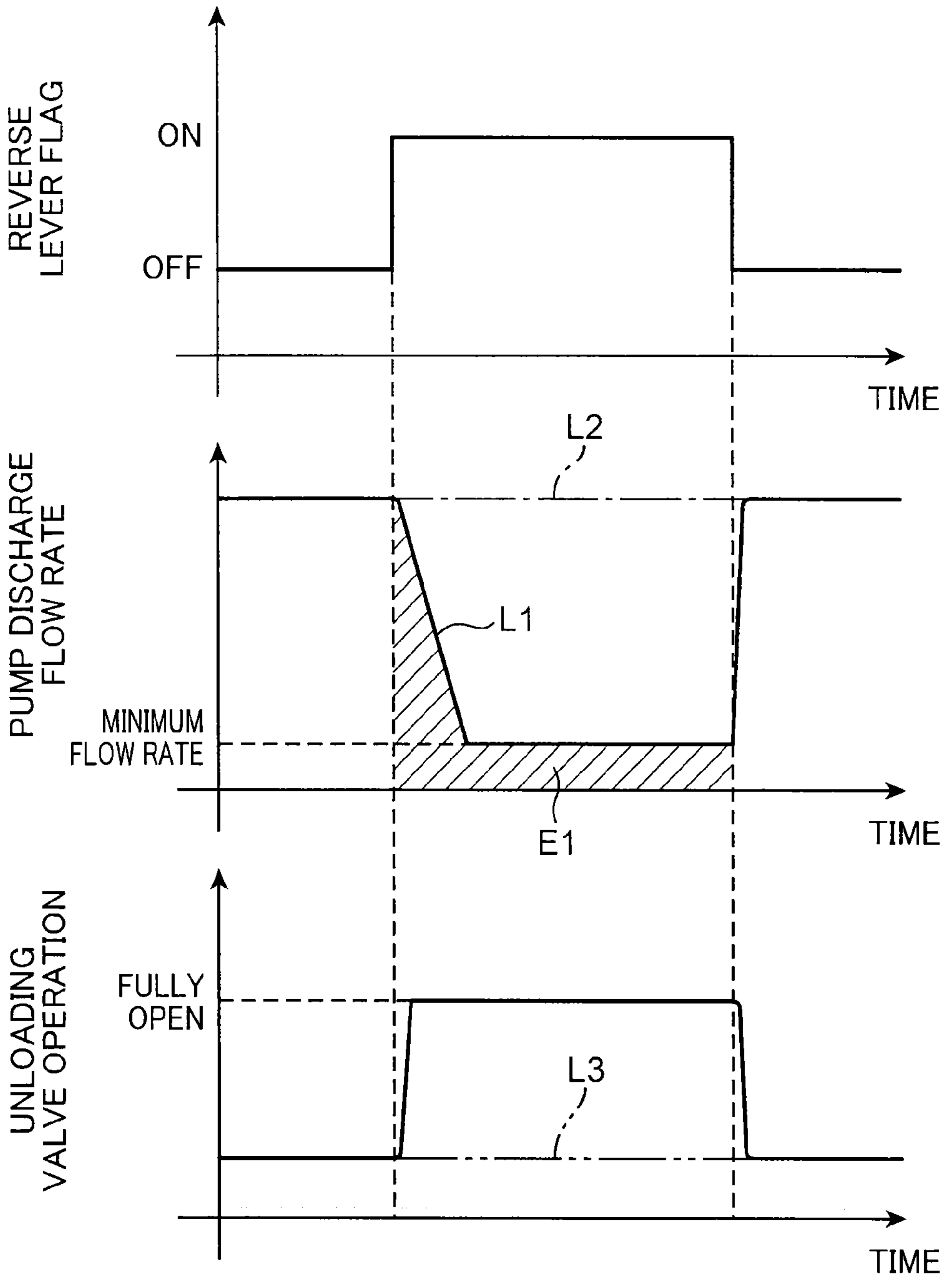
FIG. 5 illustrates timing charts showing a content of a control by the controller shown in FIG. 2.

First, an explanation will be given of a control of the capacity of the hydraulic pump 15. Incidentally, FIG. 5 shows a case where a full lever operation is carried out in a backward direction from a state of carrying out the full lever operation in the forward direction, and the full lever operation is carried out again in the forward direction.

In the forward direction operation (a state where reverse lever flag is made OFF), the controller 24 controls the capacity such that the larger the operation amount detected by the operation sensors 18A and 18B, the larger the capacity of the hydraulic pump 15 is made. In an example of FIG. 5, the capacity of the hydraulic pump 15 is set to a maximum in accordance with a state where the full lever operation is carried out.

On the other hand, in the backward direction operation (state where the reverse lever flag is made ON), the controller 24 reduces the capacity of the hydraulic pump 15 to a set value such that a discharge flow rate becomes a minimum flow rate (standby flow rate). Thereby, in comparison with the ordinary posicon in which the larger the operation amount of the remote-controlled valve 17, the larger the discharge flow rate of the hydraulic pump 15 is made as indicated by a one-dotted chain line of FIG. 5, a flow rate of a hydraulic fluid recovered to the tank W via the relief valves 19A and 19B can be reduced. Consequently, a loss of a power of the hydraulic pump 15 in the backward direction operation can be reduced.

Incidentally, although according to the present embodiment, the capacity of the hydraulic pump 15 is controlled such that the discharge flow rate becomes the minimum flow rate, the loss of the power of the hydraulic pump 15 can be reduced when the capacity of the hydraulic pump 15 is restricted more than a capacity in the forward direction operation (one-dotted chain line L2).

Here, the controller 24 gradually restricts the capacity of the hydraulic pump 15 to a restriction capacity by taking a previously set delay time period from a time point at which the backward direction operation is detected as indicated by notation L1 of FIG. 5. Thereby, it can be suppressed that the flow rate of the hydraulic fluid to the slewing motor 14 is deficient in a case where the forward direction operation is carried out immediately after the backward direction operation.

Next, an explanation will be given of a control of the opening degree of the unloading valve 22*a*.

The controller 24 adjusts the opening of the unloading valve 22*a* such that the larger the operating amount detected by the operation sensors 18A and 18B, the smaller the opening of the unloading valve 22*a* is made in the forward direction operation. In FIG. 5, the opening of the unloading valve 22*a* is adjusted to a minimum opening (fully close) in accordance with the full lever operation of the remote-controlled valve 17.

On the other hand, the controller 24 adjusts the opening of the unloading valve 22*a* to a maximum opening (fully open) in the backward direction operation. Thereby, in comparison with the conventional control in which the larger the operating amount of the remote-controlled valve 17, the smaller the opening of the unloading valve 22*a* is adjusted as indicated by a two-dotted chain line L3 of FIG. 5, the loss of the power of the hydraulic pump 15 can be reduced. Specifically, a discharge pressure of the hydraulic pump 15 can be reduced with regard to a discharge flow rate E1 indicated by hatchings of FIG. 5, and therefore, the loss of the power of the hydraulic pump 15 can further be reduced. Incidentally, although according to the present embodiment, the opening of the unloading valve 22*a* is adjusted to fully open, the loss of the power of the hydraulic pump 15 can be reduced when the opening of the unloading valve 22*a* is increased more than the opening in the forward direction operation (two-dotted chain line L3).

A detailed explanation will be given of the operation in reference to flowcharts of FIG. 3 and FIG. 4.

Figure 3:
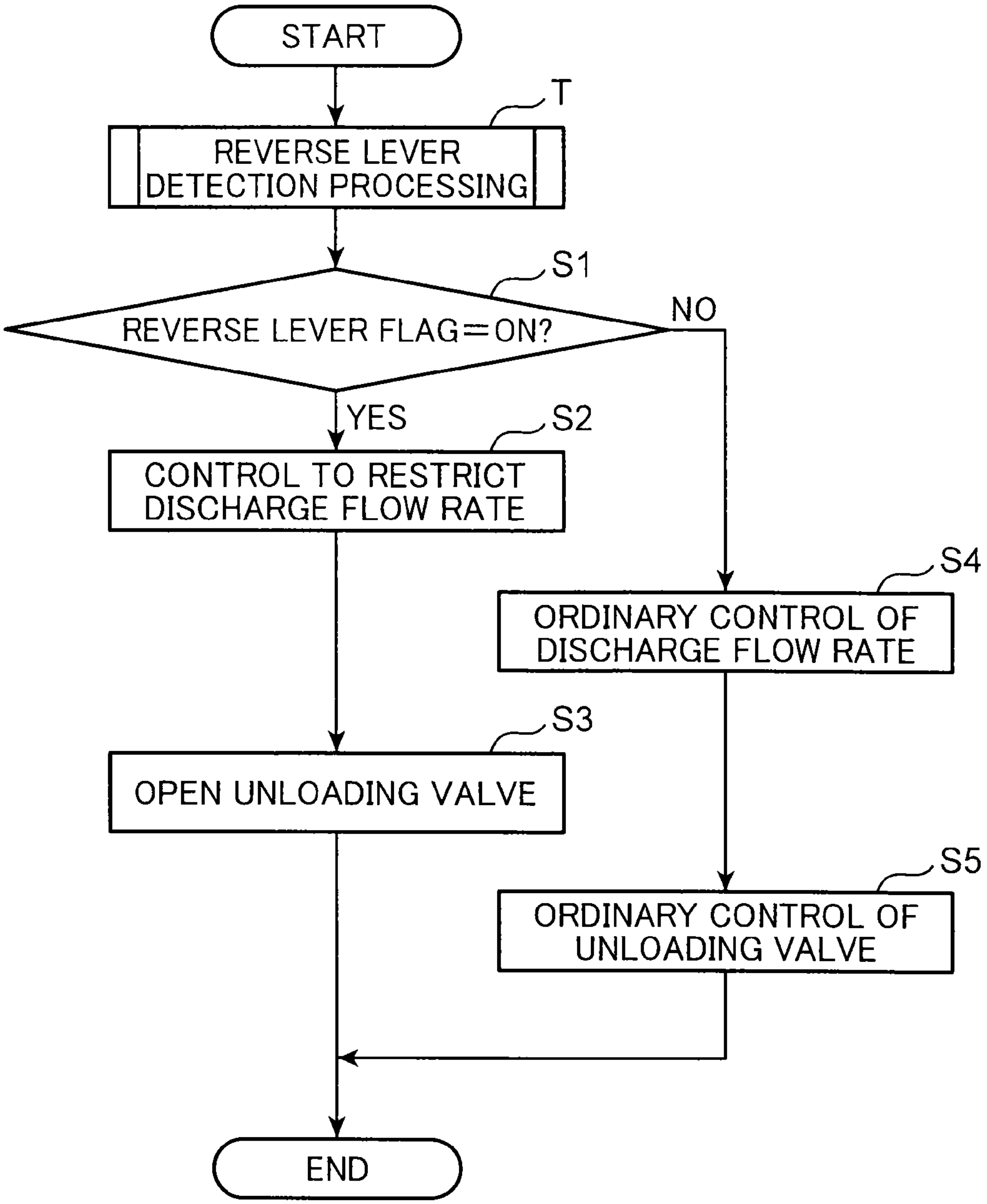
FIG. 3 is a flowchart showing processing operations executed by the controller shown in FIG. 2.

When processing operations by the controller 24 are started, in FIG. 3, first, there is executed a reverse lever detection processing T for determining whether a backward direction operation is carried out.

Figure 4:
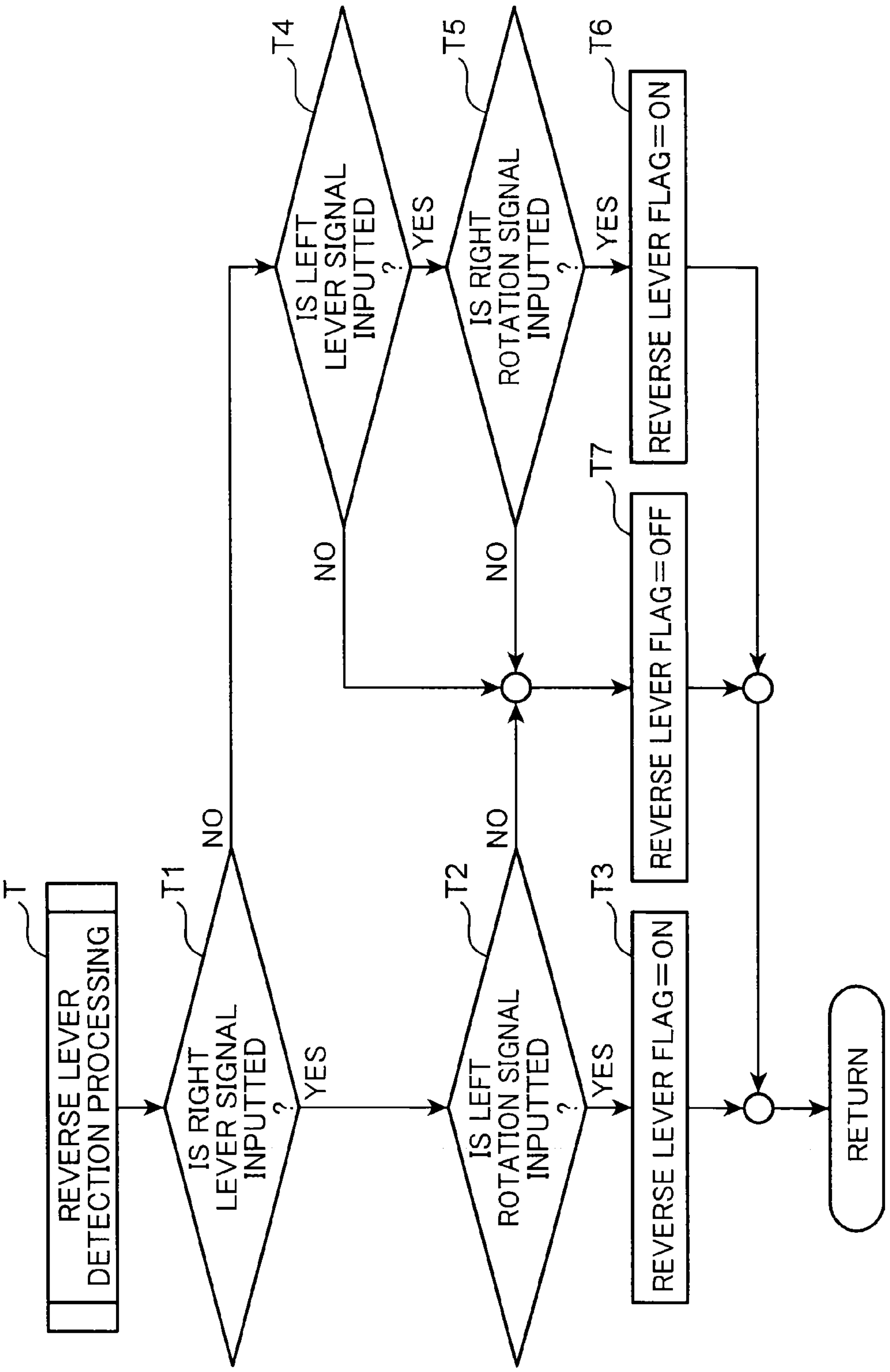
FIG. 4 is a flowchart showing a content of a reverse lever detection processing operations of FIG. 3.

In the reverse lever detection processing T, as shown in FIG. 4, it is determined whether a right lever signal is inputted from the operation sensor 18A (step T1), and when the determination is YES at step T1, it is determined whether a left rotation signal is inputted (step T2). In a case where the determination is YES at step T2, that is, in a case where the left rotation signal is inputted although the right lever signal has been inputted, it is determined that a backward direction operation is carried out, and a reverse lever flag is set to ON (step T3).

Also, in a case where the determination is NO at step T1, it is determined whether a left lever signal is inputted from the operation sensor 18B (step T4), and when the determination is YES at step T4, it is determined whether a right rotation signal is inputted (step T5). In a case where the determination is YES at step T5, that is, in a case where the right rotation signal is inputted although a left lever signal has been inputted, it is determined that a backward direction operation is carried out, and the reverse lever flag is set to ON (step T6).

On the other hand, in a case where the determination is NO at step T2 and step T5, that is, in a case where a forward direction operation is carried out or in a case where the upper slewing body 3 is not rotated although the lever operation is carried out, it is determined that the backward direction operation is not carried out, and the reverse lever flag is set to OFF (step T7).

Similarly, also in a case where the determination is NO at step T4, that is, in a case where the lever operation is not carried out, it is determined that the backward direction operation is not carried out, and the reverse lever flag is set to OFF at step T7.

In a main routine shown in FIG. 3, it is determined whether the reverse lever flag is made ON by receiving a result of the reverse lever detection processing T (step S1). When the determination is YES at step S1, a discharge flow rate (capacity) of the hydraulic pump 15 is restricted more than that in the forward direction operation as shown in FIG. 3 and FIG. 5 (step S2), and the opening of the unloading valve 22*a* is adjusted to be larger than that in the forward direction operation (step S3). Thereby, the loss of the power of the hydraulic pump 15 can be reduced by reducing the flow rate of the hydraulic fluid recovered to the tank W via the relief valves 19A and 19B, and reducing a discharge pressure of the hydraulic pump 15.

On the other hand, when the determination is NO at step S1, there is carried out an ordinary control (posicon) of a discharge flow rate in which the larger the operating amount of the remote-controlled valve 17, the larger the capacity of the hydraulic pump 15 is made (step S4). Successively, there is carried out an ordinary control of the unloading valve 22*a* in which the larger the operating amount of the remote-controlled valve 17, the smaller the opening of the unloading valve 22*a* is adjusted (step S5).

As explained above, the flow rate of the hydraulic fluid recovered to the tank W via the relief valves 19A and 19B can be reduced in the backward direction operation by restricting the discharge amount of the hydraulic pump 15 more than that in the forward direction operation when the backward direction operation is carried out.

Consequently, the loss of the power of the hydraulic pump 15 can be reduced in comparison with that in a case of setting the discharge amount of the hydraulic pump 15 similar to that in the forward direction operation when the backward direction operation is carried out.

Also, according to the embodiment, the following effect is achieved.

According to the embodiment, the discharge pressure of the hydraulic pump 15 can be reduced in the backward direction operation by adjusting to enlarge the opening of the unloading valve 22*a* more than that in the forward direction operation when the backward direction operation is carried out.

Consequently, the power of the hydraulic pump 15 can further be reduced in comparison with that in a case of adjusting the opening of the unloading valve 22*a* similar to that in the forward direction operation when the backward direction operation is carried out.

Incidentally, in a case of opening the unloading valve 22*a* in the backward direction operation, there is a concern that the hydraulic fluid led from the slewing motor 14 flows into the tank W via the control valve 16.

Here, according to the embodiment, the hydraulic fluid led from the slewing motor 14 can be restricted from flowing to the unloading valve 22*a* by the check valve 21. Therefore, the relief valves 19A and 19B can firmly be operated by the hydraulic fluid led from the slewing motor 14. That is, the decelerating operation of the upper slewing body 3 by the relief valves 19A and 19B can firmly be obtained while reducing the power of the hydraulic pump 15 by opening the unloading valve 22*a* as described above.

Also, according to the embodiment, the discharge amount of the hydraulic pump 15 is gradually reduced by taking a delay time period. Therefore, in a case where the forward direction operation is carried out immediately after the backward direction operation, it can be suppressed that the flow rate of the hydraulic fluid to the slewing motor 14 is deficient.

Further, although according to the embodiment, the discharge amount of the hydraulic pump 15 is controlled by adjusting the capacity of the hydraulic pump 15, the discharge amount of the hydraulic pump 15 may be controlled by means other than the adjustment of the capacity. For example, the discharge amount of the hydraulic pump 15 may be controlled by adjusting a driving speed of the hydraulic pump 15, or a driving speed (rotation number) of a device (engine or motor etc.) for driving the hydraulic pump 15.

Incidentally, the specific embodiment described above mainly includes the invention having the following configuration.

In order to resolve the problem described above, the present invention provides a rotation control device comprising: a slewing motor driving a slewing body to rotate; a hydraulic pump serving as a hydraulic pressure source of the slewing motor; a pair of rotation hydraulic fluid paths connected to ports on both sides of the slewing motor for driving the slewing body in two directions; a control valve provided between the respective rotation hydraulic fluid paths and the hydraulic pump and switching a supply destination of a hydraulic fluid, which is discharged from the hydraulic pump, between the respective rotation hydraulic fluid paths; a pair of relief valves serving as brake valves respectively connected to the rotation hydraulic fluid paths; rotation operating means for operating the control valve; an operation detector detecting an operating direction and an operating amount of the rotation operating means; a rotation direction detector for detecting a rotating direction of the slewing body; and a controller controlling a discharge amount of the hydraulic pump such that in a forward direction operation in which the operating direction detected by the operation detector and the rotating direction detected by the rotation direction detector coincide with each other, the discharge amount of the hydraulic pump is increased in accordance with an increase in the operating amount detected by the operation detector, on the other hand, in a backward direction operation in which the operating direction detected by the operation detector and the rotating direction detected by the rotation direction detector are reverse to each other, the discharge amount of the hydraulic pump is restricted more than the discharge amount in the forward direction operation.

According to the present invention, a flow rate of a hydraulic fluid recovered to a tank via the relief valves can be reduced in the backward direction operation by restricting the discharge amount of the hydraulic pump more than in the forward direction operation when the backward direction operation is carried out.

Consequently, a loss of a power of the hydraulic pump can be reduced in comparison with that in a case of setting the capacity of the hydraulic pump similar to that in the forward direction operation when the backward direction operation is carried out.

It is preferable that the rotation control device further includes: an unloading circuit for returning the hydraulic fluid from the hydraulic pump to a tank by being branched from a pump discharge path connecting the hydraulic pump and the control valve; and an unloading valve provided at the unloading circuit and capable of adjusting a size of an opening, wherein the controller adjusts the opening of the unloading valve to be smaller in accordance with an increase in the operating amount detected by the operation detector in the forward direction operation, on the other hand, adjusts the opening of the unloading valve to be larger in the backward direction operation than when the forward direction operation is carried out.

According to the aspect, the discharge pressure of the hydraulic pump in the backward direction operation can be reduced by adjusting to enlarge the opening of the unloading valve more than in the forward direction operation when the backward direction operation is carried out.

Consequently, the power of the hydraulic pump can further be reduced in comparison with the power of the hydraulic pump in a case of adjusting the opening of the unloading valve similar to that in the forward direction operation when the backward direction operation is carried out.

Incidentally, there is a concern that the hydraulic fluid led from the slewing motor flows to the tank via the control valve and the unloading valve in a case of opening the unloading valve in the backward direction operation as described above.

Hence, it is preferable that the rotation control device further includes a check valve provided between a branch point of the unloading circuit in the pump discharge path and the control valve, and permitting a flow of the hydraulic fluid directed from the hydraulic pump to the control valve, while restricting a flow in a direction reverse thereto.

Thereby, the relief valves can firmly be operated by the hydraulic fluid led from the slewing motor since the hydraulic fluid led from the slewing motor can be restricted from flowing to the unloading valve by the check valve. That is, a decelerating operation of the slewing body by the relief valves can firmly be obtained while reducing the power of the hydraulic pump by opening the unloading valve as described above.

It is preferable in the rotation control device that the controller gradually reduces the discharge amount of the hydraulic pump to a set value by using a preset delay time since when the backward direction operation is detected.

According to the aspect, the discharge amount of the hydraulic pump is gradually reduced by taking the delay time period, and therefore, in a case where the forward direction operation is carried out immediately after the backward direction operation, it can be suppressed that the flow rate of the hydraulic fluid to the slewing motor is deficient.

Also, the present invention provides a construction machine including: a self-propelled lower propelling body; an upper slewing body rotatably provided on the lower propelling body; and the rotation control device for rotating the upper slewing body as the slewing body.

This application is based on Japanese Patent application No. 2012-282484 filed in Japan Patent Office on Dec. 26, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A rotation control device comprising:

a slewing motor driving a slewing body to rotate;

a hydraulic pump serving as a hydraulic pressure source of the slewing motor;

a pair of rotation hydraulic fluid paths connected to ports on both sides of the slewing motor for driving the slewing body in two directions;

a control valve provided between the respective rotation hydraulic fluid paths and the hydraulic pump and switching a supply destination of a hydraulic fluid, which is discharged from the hydraulic pump, between the respective rotation hydraulic fluid paths;

a pair of relief valves serving as brake valves respectively connected to the rotation hydraulic fluid paths;

rotation operating means for operating the control valve;

an operation detector detecting an operating direction and an operating amount of the rotation operating means;

a rotation direction detector for detecting a rotating direction of the slewing body; and a controller controlling a discharge amount of the hydraulic pump such that in a forward direction operation in which the operating direction detected by the operation detector and the rotating direction detected by the rotation direction detector coincide with each other, the discharge amount of the hydraulic pump is increased in accordance with an increase in the operating amount detected by the operation detector, on the other hand, in a backward direction operation in which the operating direction detected by the operation detector and the rotating direction detected by the rotation direction detector are reverse to each other, the discharge amount of the hydraulic pump is restricted more than the discharge amount in the forward direction operation.

2. The rotation control device according to claim 1, further comprising:

an unloading circuit for returning the hydraulic fluid from the hydraulic pump to a tank by being branched from a pump discharge path connecting the hydraulic pump and the control valve; and an unloading valve provided at the unloading circuit and capable of adjusting a size of an opening, wherein the controller adjusts the opening of the unloading valve to be smaller in accordance with an increase in the operating amount detected by the operation detector in the forward direction operation, on the other hand, adjusts the opening of the unloading valve to be larger in the backward direction operation than when the forward direction operation is carried out.

3. The rotation control device according to claim 2, further comprising:

a check valve provided between a branch point of the unloading circuit in the pump discharge path and the control valve, and permitting a flow of the hydraulic fluid directed from the hydraulic pump to the control valve, while restricting a flow in a direction reverse thereto.

4. The rotation control device according to claim 1, wherein the controller gradually reduces the discharge amount of the hydraulic pump to a set value by using a preset delay time since when the backward direction operation is detected.

5. A construction machine comprising:

a self-propelled lower propelling body;

an upper slewing body rotatably provided to the lower propelling body; and the rotation control device according to claim 1 for rotating the upper slewing body as the slewing body.

6. A rotation control device comprising:

a slewing motor driving a slewing body to rotate;

a hydraulic pump serving as a hydraulic pressure source of the slewing motor;

a pair of rotation hydraulic fluid paths connected to ports on both sides of the slewing motor for driving the slewing body in two directions;

a control valve provided between the respective rotation hydraulic fluid paths and the hydraulic pump and switching a supply destination of a hydraulic fluid, which is discharged from the hydraulic pump, between the respective rotation hydraulic fluid paths;

a pair of relief valves serving as brake valves respectively connected to the rotation hydraulic fluid paths;

an operator actuatable valve providing an output to the control valve for operating the control valve;

an operation detector detecting an operating direction and an operating amount of the operator actuatable valve;

a rotation direction detector for detecting a rotating direction of the slewing body; and control means for controlling a discharge amount of the hydraulic pump such that in a forward direction operation in which the operating direction detected by the operation detector and the rotating direction detected by the rotation direction detector coincide with each other, the discharge amount of the hydraulic pump is increased in accordance with an increase in the operating amount detected by the operation detector, on the other hand, in a backward direction operation in which the operating direction detected by the operation detector and the rotating direction detected by the rotation direction detector are reverse to each other, the discharge amount of the hydraulic pump is restricted more than the discharge amount in the forward direction operation.

* * * * *